US005516118A

United States Patent [19]

Jones

[11] Patent Number: 5,516,118
[45] Date of Patent: May 14, 1996

[54] CIRCUMFERENTIAL HYDRODYNAMIC SEALS FOR SEALING A BIDIRECTIONALLY ROTATABLE MEMBER

[75] Inventor: Richard A. Jones, Bryn Mawr, Pa.

[73] Assignee: Stein Seal Company, Kulpsville, Pa.

[21] Appl. No.: 93,364

[22] Filed: Jul. 19, 1993

[51] Int. Cl.⁶ .................................................. F16J 15/30
[52] U.S. Cl. .............................. 277/3; 277/75; 277/96.1
[58] Field of Search .................................. 277/157, 215, 277/199, 27, 3, 96.1, 93 SD, 75, 201, 76

[56] References Cited

U.S. PATENT DOCUMENTS

| | | | |
|---|---|---|---|
| 2,036,308 | 4/1936 | Vroom | 277/70 |
| 3,759,532 | 9/1973 | Lindeboom | 277/74 |
| 3,804,424 | 4/1974 | Gardner | 277/74 |
| 3,894,741 | 7/1975 | McHugh | 277/27 |
| 4,082,296 | 4/1978 | Stein | 277/3 |
| 4,523,764 | 6/1985 | Albens et al. | 277/3 |
| 4,916,892 | 4/1990 | Pope | 277/96.1 |
| 4,943,069 | 7/1990 | Jinnouchi | 277/27 |
| 5,145,185 | 9/1992 | Pope | 277/70 |

*Primary Examiner*—Scott W. Cummings
*Attorney, Agent, or Firm*—Zigmund L. Dermer

[57] ABSTRACT

A seal for sealing between a bidirectionally rotating shaft rotatable in the forward and reverse directions and having a sealing surface thereon located in a pressurized housing containing the shaft. A seal ring mounted in the housing for movement toward and away from the shaft sealing surface and having a high pressure side, a low pressure side, a seal face opposed to the shaft seal surface and an outer face remote from the seal face and exposed to the pressure in the housing. Resilient elements urge the seal ring toward the sealing surface of the shaft. Hydrodynamic elements in the form of a plurality of spaced recesses in the seal face of the seal ring and formed so as to produce negative hydrodynamic lift in the recess and urge the seal ring toward the sealing surface of the rotating shaft during forward rotation thereof. Openings extend through the seal ring from a predetermined section of the grooved seal surface thereof to the remote face of the seal ring to accommodate flow through such openings to reduce pressure build-up in the grooves of the sealing face to prevent seal leakage during reverse rotation of the shaft. A second seal is provided between the housing and the low pressure side of the seal ring.

7 Claims, 3 Drawing Sheets

5,516,118

CIRCUMFERENTIAL HYDRODYNAMIC SEALS FOR SEALING A BIDIRECTIONALLY ROTATABLE MEMBER

BACKGROUND OF THE INVENTION

In his U.S. Pat. No. 4,082,296, issued on Apr. 4, 1978, P. Charles Stein provided a plurality of embodiments of sealing members for sealing between a rotating member and a housing. The sealing members were provided in certain embodiments in the form of a segmented seal ring resiliently mounted about a shaft to move toward and away from the shaft to provide a seal therebetween. In the circumferential sealing face of each segment which faces adjacent the shaft, predetermined precise grooves are provided which produce a negative hydrodynamic lift force and urge the seal ring segments toward the rotating shaft in order to reduce leakage thereacross.

In other embodiments of the Stein Patent, particularly the embodiment of FIGS. 8 and 9 thereof, the rotating member or shaft is provided with a circumferential flange therein and a unitary seal ring effects a seal between a radially disposed face on the flange and a radially disposed face on the seal ring which coacts with the adjacent radial face on the flange. In that arrangement, the seal ring, which may be formed of circumferential segments, but normally from a single unitary ring, has on the sealing face thereof the grooves which produce the aforedescribed negative hydrodynamic lifting force between the seal ring and the rotatable flange to provide the reduced seal leakage.

In certain applications of the Stein Patent seal rings, a seal is provided for use with a bidirectionally rotatable shaft. In those examples, during forward rotation of the shaft, the medium in which the seal is operating (e.g., oil, water or gas), when the shaft is operating in its forward or normal direction, is swept out of the sealed grooves by a pumping action to provide the negative hydrodynamic lift force and to move the seal ring toward the rotatable member to effectuate greater sealing. In these applications, however, where a bidirectionally rotatable shaft is required to be sealed, when the seal operates in the reverse direction, the medium, especially a more viscous medium such as oil, pressure builds up in the grooves particularly adjacent the low pressure side of the seal ring which in certain instances is sufficient in magnitude to lift the seal ring away from the rotatable member causing it to leak. The purpose of this invention is to provide a modification of the Stein Patent seal arrangements for use with bidirectionally rotatable members to overcome a potential leakage problem with the seal ring when the rotatable member is operated in reverse. Any potential problem which occurs during reverse rotation of the shaft is solved by this invention.

SUMMARY OF THE INVENTION

This invention provides in a seal ring having a configuration which provides negative lift forces to urge the seal ring toward a rotatable member, which ring includes a plurality of grooves in the circumferential face of the ring adjacent the rotatable member which provide negative hydrodynamic lift. Pressure relief means are provided which releases certain pressure build-up in the grooves during reverse rotation of the rotating member which includes a plurality of pressure relief openings extending through the seal ring from predetermined portions of the grooves in the sealing face to the remote face of the ring.

DETAILED DESCRIPTION

Figure 1:
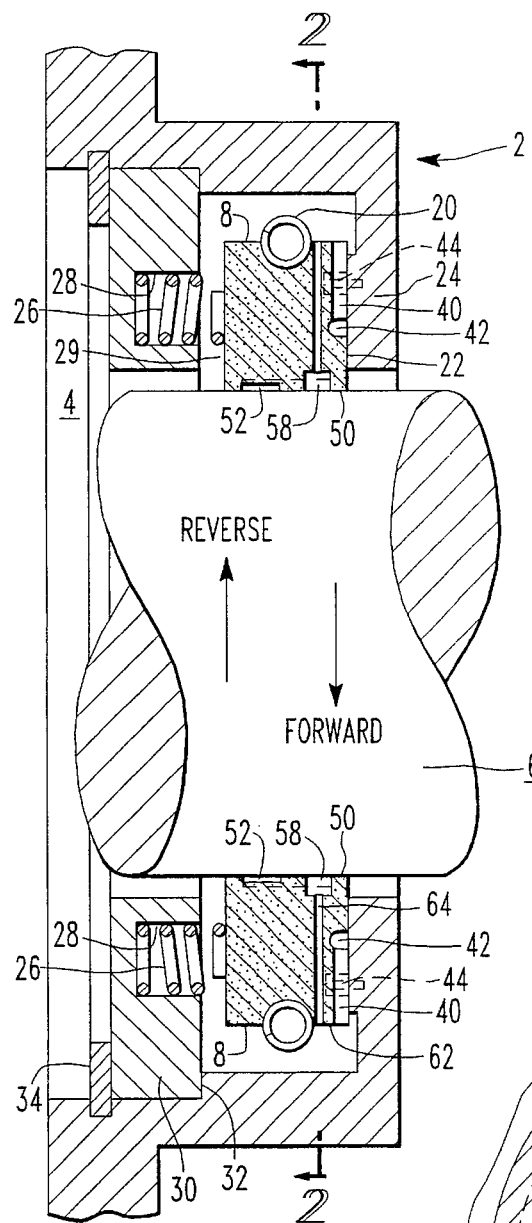
FIG. 1 is a vertical section of a seal in accordance with this invention sealing between a housing and a rotating shaft.
Figure 2:
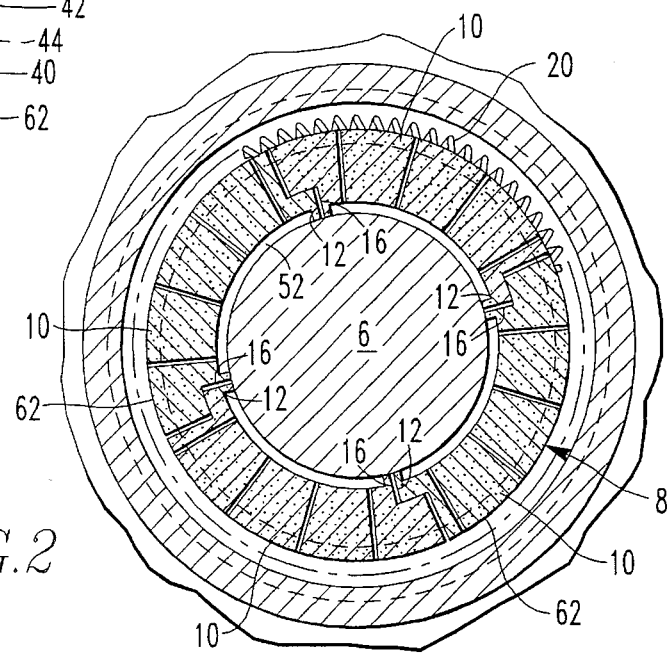
FIG. 2 is a vertical section taken on a plane indicated by the lines 2—2 in FIG. 1.
Figure 3:
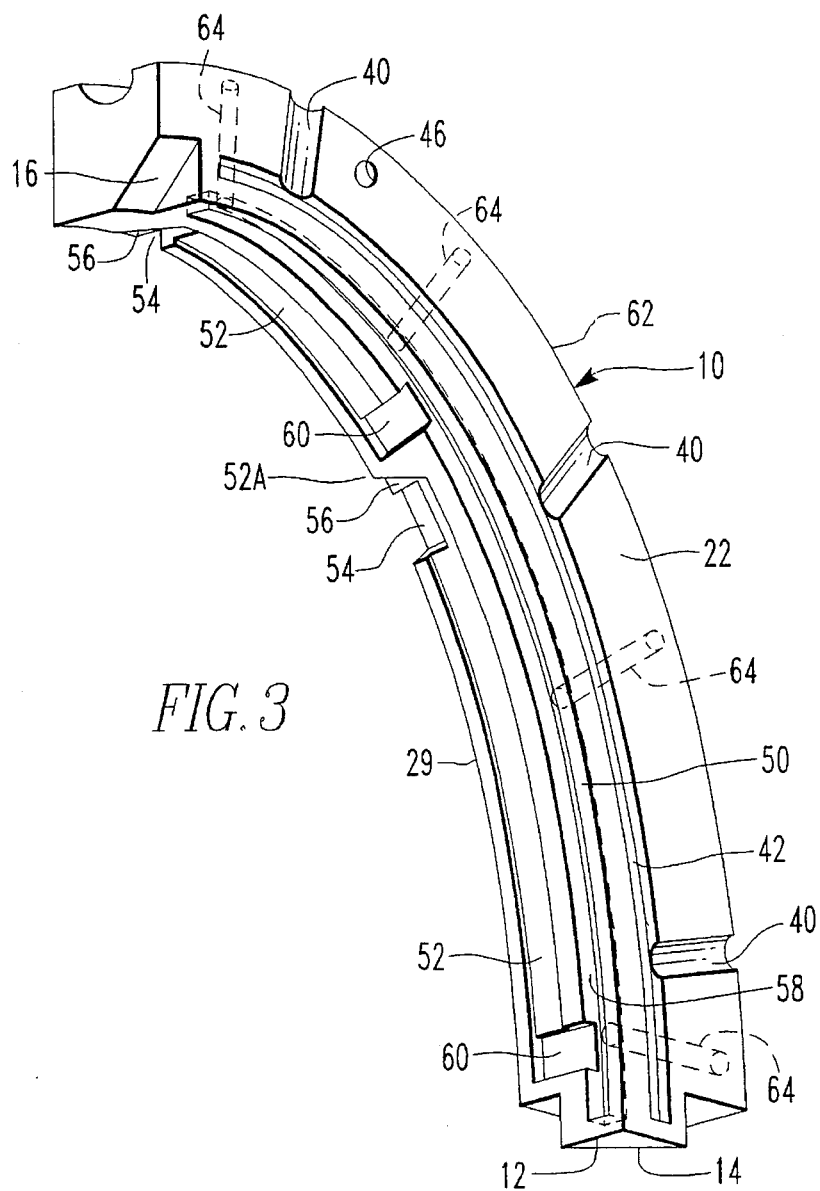
FIG. 3 is a perspective view of a segment of the seal ring shown in FIG. 1 taken from the low pressure side.
Figure 4:
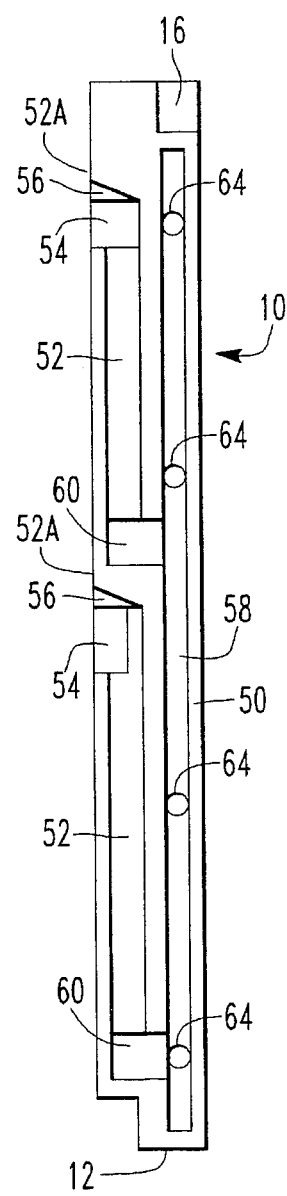
FIG. 4 is a development view of the sealing face of the seal ring of FIG. 3.

As shown in FIG. 1, a housing 2 forms a chamber 4 adapted to contain a fluid. A shaft 6 passes through housing 2 into chamber 4. A seal ring 8 has four segments 10 (FIG. 2). Each segment 10 has an offset tongue portion 12 (FIG. 3) with a diagonal face 14 which mates with a diagonally cut groove portion 16 on the adjacent segment 10 to provide for continuous sealing structure irrespective of any expansion or contraction of seal ring 8. The segments 10 are urged into contact with shaft 6 by a garter spring 20. The downstream faces 22 of segments 10 are urged against flange 24 of housing 2 by compression coil springs 26 contained in pockets 28 of closing ring 30 which is retained between casing shoulder 32 and retaining ring 34.

The downstream or low pressure face 22 of each segment also serves as a sealing face and is provided on a portion thereof with radial grooves 40 connected to a peripheral groove 42 to permit the passage of fluid from chamber 4 into groove 42 to counterbalance in part the fluid pressure on the high pressure side 29 to reduce the pressure loading of the segments against flange 24. Locking pins 44 (FIG. 1) mounted in flange 24 fit loosely in openings 46 in seal ring 8 to prevent the segments 10 from rotating and yet permit the segments to move towards and away from shaft 6.

Grooves 40 and 42 would be unnecessary where the fluid in chamber 4 is at nominal pressure.

As shown in Stein Patent 4,082,296, the sealing face 50 has a pair of shallow recesses 52. Typically the depth of each recess 52 will be in the range of from about 0.002 to about 0.030 cm. depending on fluid viscosity and shaft speed. The end of each recess 52 in the direction of the forward rotation of shaft 6 opens into an axial cutout portion 54 in face 50 which also forms an opening in face 29 so that each recess 52 is thereby placed in direct communication with the fluid in chamber 4. Axial cutout portion 54 has an angled portion 56 which acts as a fluid scraper facilitating the flow of fluid into chamber 4.

In operation with a liquid in chamber 4, the forward rotation of shaft 6 causes a shear-drag on the liquid in recess 52 which would move the liquid in the recess toward the axial cutout portions 54 except that the reduced film thickness at the entry surface 52A impedes inflow into the recess. This, as explained in the aforementioned Stein patent, results in a lowering of the pressure in the recess and effectively creates negative hydrodynamic lift. This negative lift force, which urges the seal toward the shaft surface can be made of such magnitude that it precludes "surf-boarding" and excessive leakage past the seal.

In accordance with the invention, a circumferential groove 58 of greater depth than grooves 52 is provided in the inner circumferential face 50 of each segment 10 of seal ring 8 between the grooves 52 and the low pressure face 22. Circumferential groove 58 serves as a pressure relief groove for the seal ring segments 10 with groove 58 being deeper than grooves 52 and being located downstream from each recess 52 on the seal surface. Groove 58 terminates in this embodiment adjacent to but spaced from the radially extending end surfaces of each segment 10. Each of the recesses 52 is connected to the pressure relief groove 58 by an axial passage 60. Thus, pressure relief groove 58 communicates with each of the recesses 52 in each seal ring 10. When shaft 6 is operated in the forward or normal direction, a negative hydrodynamic lift force is created on segments 10 of ring 8 to move each of the segments 10 toward shaft 6 and reduce any leakage therebetween. However, when shaft 6 is operated in the reverse direction, fluid is pumped into recesses 52 and into groove 58 and the pressure build-up in groove 58 increases to a point where spill-over or seal leakage can occur, causing segments 10 to move away from shaft 6. In order to avoid such pressure build-up and leakage during reverse rotation, especially during low-pressure differential operation of the seal ring in a high viscosity (e.g. oil) medium, a plurality of spaced radial openings 64 are provided in each seal ring segment 10 which originate in the base of groove 58 and terminate in the outer, or remote, circumferential surface 62 of seal ring segments 10. Radial openings 64 reduce the pressure build-up in groove 58 by passing the high viscosity or other fluid into the chamber 4 through radial openings 64. In the illustrated embodiment of this invention, each of the seal ring segments 10 includes four substantially evenly-spaced radial pressure relief openings 64 with the size of the pressure relief openings 64 being such as to have relatively small, if any, pressure drop thereacross, for example, 3/32 inch diameter radial openings in a shaft seal for a 3.5 inch diameter shaft.

Figure 5:
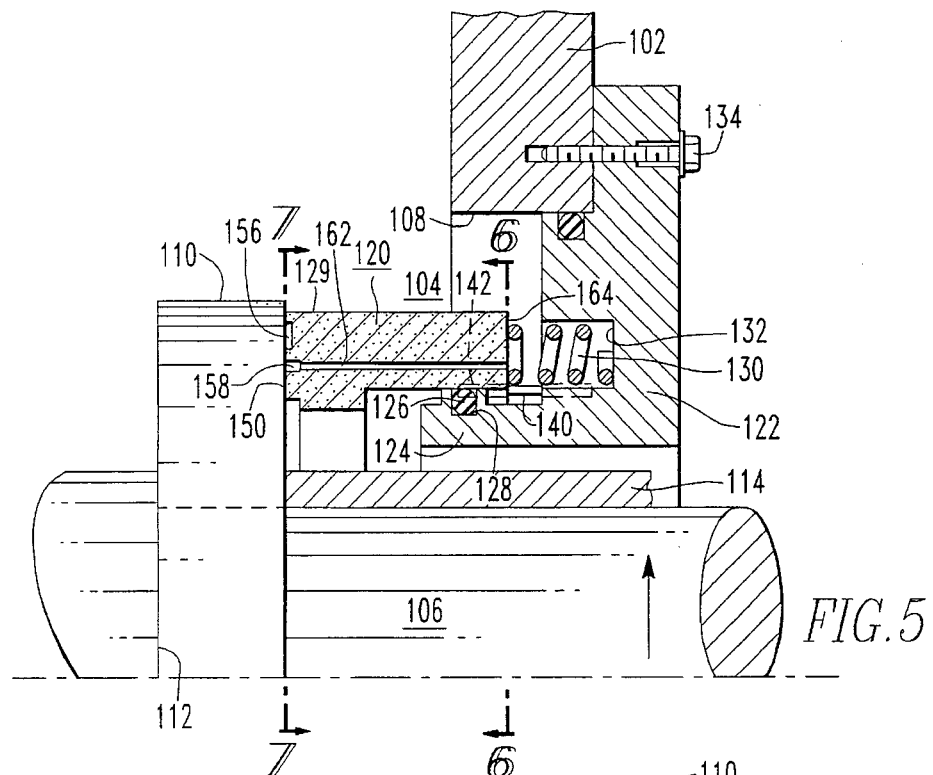
FIG. 5 is a vertical section partially broken away through an alternative seal ring embodiment in accordance with this invention.
Figure 6:
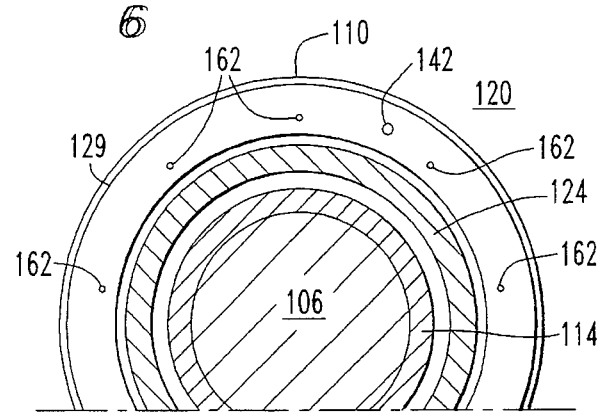
FIG. 6 is a vertical section of the seal of FIG. 5 taken in the plane indicated by the line 6—6 in FIG. 5.
Figure 7:
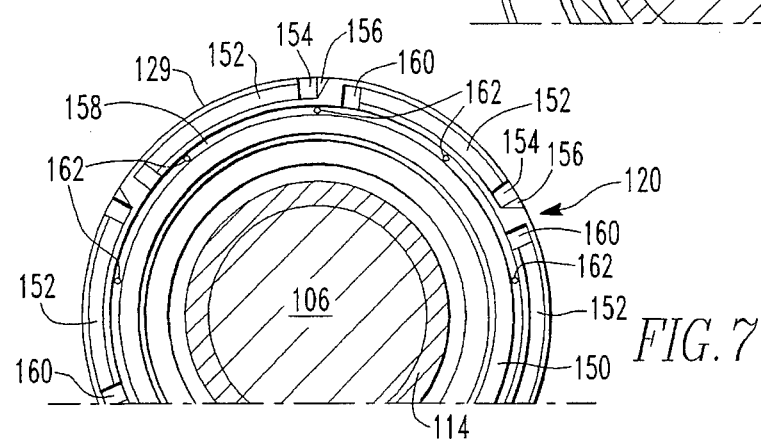
FIG. 7 is a vertical section of the seal of FIG. 5 and taken along the plane indicated by the lines 7—7 of FIG. 5.

An alternative embodiment involving sealing against a rotating ring is shown in FIGS. 5, 6 and 7. Here a casing 102 forms a chamber 104 which is adapted to contain a fluid. A rotating shaft 106 passes through an opening 108 in casing 102 and carries a seal mating ring or seal runner 110 which is held against a shoulder 112 on shaft 106 by a securing sleeve 114 secured to shaft 106 by a nut (not shown) on shaft 106. A ceramic or graphite rubbing seal ring 120 is carried by a seal holder 122 which has an annular ring portion 124 received within the inner diameter of seal ring 120. A seal therebetween is effected by O ring 126 which is positioned in an annular groove 128 formed in the outer surface of ring portion 124 and engages the inner diameter of seal ring 120. A pin 140 secured in holder 122 is loosely engaged in an opening 142 (FIG. 6) in seal ring 120 to prevent the rotation of the seal ring 120.

Seal ring 120 is urged into contact with ring 110 by compression coil springs 130 (only one of which is shown in FIG. 5) carried in pockets 132 in flange 110, which is bolted to casing 102 by bolts indicated at 134.

Referring to FIG. 7, it will be seen that the sealing face 150 of seal ring 120 includes groove means for providing negative hydrodynamic lift between the seal ring 120 and the runner 110 to minimize leakage across seal face 150 during forward rotation of the shaft 106. The sealing surface 150 has in this example six pockets or shallow recesses 152 (only four of which are shown) having the end thereof in the direction of forward rotation of the shaft 106 and runner 110 opens outwardly into radial cutout portion 154 in the face 150 which also forms an opening in face 129 (a face exposed to high pressure) so that each recess 152 is in direct communication with the fluid in chamber 104. Cutout portion 154 also has an angled portion 156 which acts as a fluid scraper facilitating the flow of fluid into chamber 104. The operation of the fluid in recesses 152 is the same as described in connection with fluid in recesses 52 of the embodiment of FIGS. 1–4 and results in the production of a negative hydrodynamic lifting force on seal ring 120.

A continuous circumferential groove 158 of greater depth than recesses 15 is provided in seal ring 120 on the downstream or low pressure side of seal ring 120 and serves as a pressure relief groove for the seal ring. (It will be noted that if seal ring 120 were not made of a single ring, but from segments, groove 158 would terminate short of each end of the segments.) Groove 158 is connected to each recess 152 by a radial passageway 160. For reasons to be explained, seal ring 120 includes a plurality (in this example, nine) axial passageways 162 extending symmetrically around groove 158 and extending through the ring 120 from the base of groove 158 to the remote or high pressure side 164 of the seal ring 120.

When shaft 106 is operated in the forward or normal direction, a negative hydrodynamic lift force is created on seal ring 120 to move it toward runner 110 and reduce any leakage therebetween. However, when shaft 106 is operated in the reverse direction, fluid is pumped into recesses 152 and into groove 158 and the pressure build-up in groove 158 increases to a point where spill-over or seal leakage can occur, causing seal ring 120 to move away from shaft 106. In order to avoid such pressure build-up and leakage during reverse rotation, especially during low-pressure differential operation of the seal ring in a high viscosity (e.g. oil) medium, the axial openings 162 reduce the pressure build-up in groove 158 by passing the high viscosity or other fluid into the chamber 104 through radial openings 162. While the pressure relief openings 64 (FIGS. 1–4) and 162 (FIGS. 5–7) do function, during normal operation, to reduce the negative hydrodynamic lift force on seal ring 8 or 120 during forward rotation of the shaft, such reduction in the closure force of seal ring segments 10 or seal ring 120 is accommodated in the seal design. Thus, the pressure relief openings 64 or 162 are appropriately sized for each seal ring size and application, so that appropriate negative hydrodynamic lift forces on seal ring segments 10 or seal ring 120 are sufficient to meet the operating criteria. Furthermore, in the embodiment of FIGS. 1–4, should increased closure force of the seal ring against the shaft 6 be required, radial springs (not shown) may be substituted for the garter spring 20, which radial springs extend from housing 2 to the remote side 62 of each of the seal ring segments 10. A plurality, for example, up to four radial springs, may be employed with each seal ring segment 10 for certain applications to increase the sealing force of the seal ring 8 against the shaft 6. Such radial springs, not shown, may, of course, have their ends received in recesses in housing 2 and in seal ring segments 10, respectively, in a manner well known in the art.

As is known, the seal ring segments 10 may be made of materials usually employed for rubbing seal such as carbon-graphite or bronze.

It will be understood that the above-discussed embodiments of this invention are illustrative and not intended to be limiting thereof. Other modifications may also be employed and fall within the spirit and scope of this invention.

I claim:

1. In a rubbing seal for sealing between a rotatable member and a housing containing a fluid and having (1) a seal ring mounted for movement toward and away from the rotatable member, and having an adjacent sealing face sealing against the rotatable member, (2) said ring having a remote, outer face generally opposite the sealing face, (3) means for biasing said sealing face of the seal ring toward the rotatable member, (4) said seal ring having recesses in said sealing face for producing a negative hydrodynamic lift urging the seal ring toward the rotatable member due to fluid flow induced by the forward rotation of the rotatable member, and (5) means to limit the rotation of the seal, the improvement comprising:

at least one pressure relieving passageway extending in said seal ring from each of said recesses through said seal ring opening onto said outer face, whereby, during reverse rotation of said rotating member, pressure build-up in each of said recesses is relieved by fluid flow through said passageway.

2. A seal in accordance with claim 1 in which said seal ring comprises a plurality of circumferential segments positioned outwardly of and movable toward and away from said rotating member, each segment formed to provide sealing means for sealing the path between each adjacent segment, said sealing face comprising the inner circumferential face of each of said segments, at least one of said recesses being formed in each of said segments and wherein said rotating member comprises a rotatable shaft and wherein the seal is effected between the sealing face of said ring member and the outer surface of said shaft.

3. A seal in accordance with claim 1, having the downstream surface of said seal ring extending between said seal face and said remote face positioned adjacent said housing and a secondary seal disposed between said housing and said seal ring along said downstream face whereby said remote surface is exposed to the high pressure in said housing.

4. A seal in accordance with claim 1 wherein said recesses include a plurality of symmetrically spaced shallow grooves provided on the sealing face and exposed to the high pressure side of said seal ring, said sealing face including a deeper circumferentially extending groove adjacent the low pressure side of said sealing face and communicating with each shallow groove in said sealing face, and said pressure relief passageway extending between said deeper groove and said remote face.

5. A seal in accordance with claim 4 including each seal segment having at least two shallow groove segments in the seal face thereof and each of said shallow grooves communicating with the deeper groove on the downstream side of each shallow groove.

6. A seal in accordance with claim 5 having in each of said seal segments a plurality of spaced passageways in each of said deeper grooves thereof extending between the bottom of said deeper grooves and said remote face.

7. In a circumferential rubbing seal for sealing between a bidirectionally rotatable shaft and a housing containing a fluid and having (1) a seal ring mounted for movement towards and away from the shaft and having a plurality of segments each having a sealing face with a circumferential sealing portion sealing against the shaft with the sealing portions of adjacent sections in contact to form a continuous seal, (2) each segment having a circumferential face remote from said shaft, (3) means to bias the sealing face of each segment towards the shaft, (4) each of said sealing faces having recesses formed therein for producing a negative hydrodynamic lifting force urging each segment toward the shaft due to flow induced during the forward rotation of said shaft, (5) and means to limit the rotation of the seal ring, the improvement comprising:

each of said segments having at least one passageway extending radially therethrough from said recess and opening on the remote circumferential surface thereof, whereby, during reverse rotation of said shaft, pressure build-up in each of said recesses is relieved by fluid flow through said passageway.

\* \* \* \* \*